(12) United States Patent
Urata

(10) Patent No.: US 6,799,272 B1
(45) Date of Patent: Sep. 28, 2004

(54) REMOTE DEVICE AUTHENTICATION SYSTEM

(75) Inventor: Susumu Urata, San Jose, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/320,494

(22) Filed: May 26, 1999

(51) Int. Cl.⁷ .............................................. H04L 9/32
(52) U.S. Cl. ...................... 713/171; 713/170; 713/169; 713/182; 713/179
(58) Field of Search ................................. 713/171, 182, 713/179, 168, 170, 169, 167; 380/264, 270, 280, 241, 273, 44

(56) References Cited

U.S. PATENT DOCUMENTS

| | | | | |
|---|---|---|---|---|
| 3,703,727 A | * | 11/1972 | Knowlton | 711/217 |
| 4,356,549 A | * | 10/1982 | Chueh | 711/216 |
| 4,601,011 A | * | 7/1986 | Grynberg | 713/184 |
| 4,633,391 A | * | 12/1986 | Rundell | 707/7 |
| 4,674,039 A | * | 6/1987 | Chouery | 712/300 |
| 5,530,758 A | * | 6/1996 | Marino et al. | 713/150 |
| 5,682,428 A | * | 10/1997 | Johnson | 705/71 |
| 5,694,472 A | * | 12/1997 | Johnson et al. | 713/189 |
| 5,727,061 A | * | 3/1998 | Johnson et al. | 713/165 |
| 5,737,424 A | * | 4/1998 | Elteto et al. | 380/28 |
| 5,757,909 A | * | 5/1998 | Park | 380/201 |
| 5,978,483 A | * | 11/1999 | Thompson et al. | 380/262 |
| 6,193,607 B1 | * | 2/2001 | Kay | 463/22 |
| 6,194,991 B1 | * | 2/2001 | Barrs et al. | 340/5.72 |
| 6,336,114 B1 | * | 1/2002 | Garrison | 707/9 |
| 6,466,983 B1 | * | 10/2002 | Strazza | 709/227 |
| 6,512,742 B1 | * | 1/2003 | Alexander, Jr. et al. | 370/231 |
| 2001/0056546 A1 | * | 12/2001 | Ogilvie | 713/200 |

* cited by examiner

Primary Examiner—Norman M. Wright

(57) ABSTRACT

Method and system for authenticating a remote device are disclosed by an arrangement in which the remote device and an authentication center each contain an identical key code index, which includes a plurality of key code numbers. When a remote device identifies itself to the authentication center by sending identification information, the authentication center generates a first key using a portion of the received identification information and a first random number that specifies a first key code number. The remote device determines the first key code number from the first key. If the remote device recognizes the first key code number from among the stored plurality of key code numbers, the remote device generates a second key, which includes a second random number that specifies a second key code number, and a portion of the identification information. From the second key, the authentication center determines a second key code number. If the first and second key code numbers match the remote device is authenticated, otherwise the remote device is not authenticated.

14 Claims, 2 Drawing Sheets

REMOTE DEVICE AUTHENTICATION SYSTEM

FIELD OF THE INVENTION

This invention relates to an authentication system and, more particularly, to an authentication system for ensuring the validity of a remote device, for example, a wireless telephone or smartcard.

BACKGROUND OF THE INVENTION

Various forms of remote devices are required by users to effectively communicate and conduct commercial transactions remotely. Such remote devices include credit cards, debit cards, calling cards (when used to conduct transactions over the Internet), smartcards, as well as wireless or radio telephones. Equally important, users rely on such remote devices to communicate, access remote services or engage in commercial transactions in which privacy and/or security is desired and, in many cases, expected. However, a growing epidemic of Internet credit card and wireless telephone communications fraud has deprived, and continues to deprive, both consumers and service providers of hundreds of millions of dollars per year. For example, a typical fraudulent ploy for the theft of wireless communications services includes programming the equipment number of a legitimate user's wireless telephone into another wireless telephone to enable a fraud perpetrator to charge calls to the legitimate user's account. With regard to credit cards, different fraudulent ploys are used for illegally acquiring a user's credit card number for subsequent theft of services. Those fraudulent ploys include intercepting the credit card information during transmission over the Internet while the user is engaged in a commercial transaction.

Using wireless telephones as an example, currently, when a wireless telephone user places a call, his or her wireless telephone indicates to the service provider identification information, including the identity of the caller (e.g. telephone number and equipment number of the wireless telephone) for billing purposes. Although privacy and security of this information is clearly desired, it may not be encrypted. If an interloper eavesdrops at the right time, he or she can obtain the user's identification information. Thereafter, the interloper can program his or her wireless telephone to impersonate the legitimate user to fraudulently obtain services. Alternately, an interloper can impose himself/herself into an established call and overpower the user's wireless telephone equipment by transmitting more power. The call can then be redirected to the interloper's purpose by sending certain control codes to the service provider. Basically, such piracy succeeds because the service provider has no mechanism for independently authenticating the identity of the caller at the time the connection is established and/or while the connection is active.

Several standard cryptographic methods exist for solving the general sort of remote user authentication problem that exists in wireless telephony, however, these methods each have significant limitations. One such method includes a classical challenge/response protocol, using a private key cryptographic algorithm. In this approach, a caller's wireless telephone is issued a key code number, which is also known by a home system. When the caller authentication system wishes to authenticate a caller, it applies to the home system for a challenge and a response for the particular caller to use. One problem with this approach is that often the caller authentication system is unable to contact the home system quickly enough to allow authentication of a call setup or the database software on the home system is unable to look up the caller's key code number and compose the challenge/response pair quickly enough, resulting in unacceptable delays. Another problem with this approach is that the caller's key code number is transmitted in its natural state over the wireless communication network, thus, a hacker or interloper can intercept the key code number.

Technology is available to permit an eavesdropper to intercept a remote user's identification information. In particular, with regard to wireless telephones, technology exists to automatically scan all of the wireless frequencies in a given cell for such identification information. Consequently, piracy of wireless telephone services is rampant. Also, the lack of enciphering of the speech signals lays bare to eavesdroppers the content of conversations.

Although some advanced variations on this theme use a Personal Identification Number (PIN) peculiar to a remote device (e.g., credit cards), the problem with many of these approaches is that the PIN is transmitted in its natural state by the open communication network (e.g., the Internet) along with other user identification information (e.g. the credit card number), thus, these variations suffer some of the same limitations described above.

In short, there is a clear and present need for an effective means to authenticate remote devices that use various forms of open communication, in particular, wireless telephony communication and the Internet.

SUMMARY OF THE INVENTION

The problems associated with remote device authentication are reduced or overcome by an arrangement in accordance with the principles of the invention in which a remote device and an authentication center each store an identical key code index which includes a plurality of key code numbers. The remote device and authentication center communicate with each other through first and second keys, that each specify a particular key code number from the key code index. Specifically, the remote device translates the first key received from the authentication center to determine the particular key code number and then generates a second key also specifying the particular key code number. Thereafter, the authentication center translates the second key to determine a second key code and compares the first and second key code numbers. If the two key code numbers match, the remote device is authenticated. The remote device may be, for example, (1) a wireless telephone, (2) a smartcard or (3) a credit card used in conjunction with an Internet access device such as a personal computer (PC) and the authentication center may be, for example, a wireless base station or a credit/smartcard authentication center.

In one illustrative embodiment, the authentication center determines whether the remote device is a registered remote device from identification information received from a particular remote device. If so, the authentication center generates a first key using a first random number that specifies a first key code number via a "number modulo N" technique (where N is an integer equal to the number of key codes in the key code index). This first key is then transmitted to the remote device over an open communication system. The remote device uses the first key in conjunction with the number modulo N technique to determine the first key code number. If the remote device recognizes the first key code number from among the stored plurality of key code numbers, the remote device generates a second random number that specifies a second key code number via the number modulo N technique. Using the second random number, a second key is generated and transmitted to the authentication center over the open communication system.

From the second key, the authentication center determines the second key code number using the second random number and the number modulo N technique. If the first and second key code numbers match, the remote device is authenticated, otherwise the remote device is not authenticated.

BRIEF DESCRIPTION OF THE DRAWING

The invention will be more readily understood after reading the following detailed description taken in conjunction with the accompanying drawing, in which.

DETAILED DESCRIPTION

Figure 1:
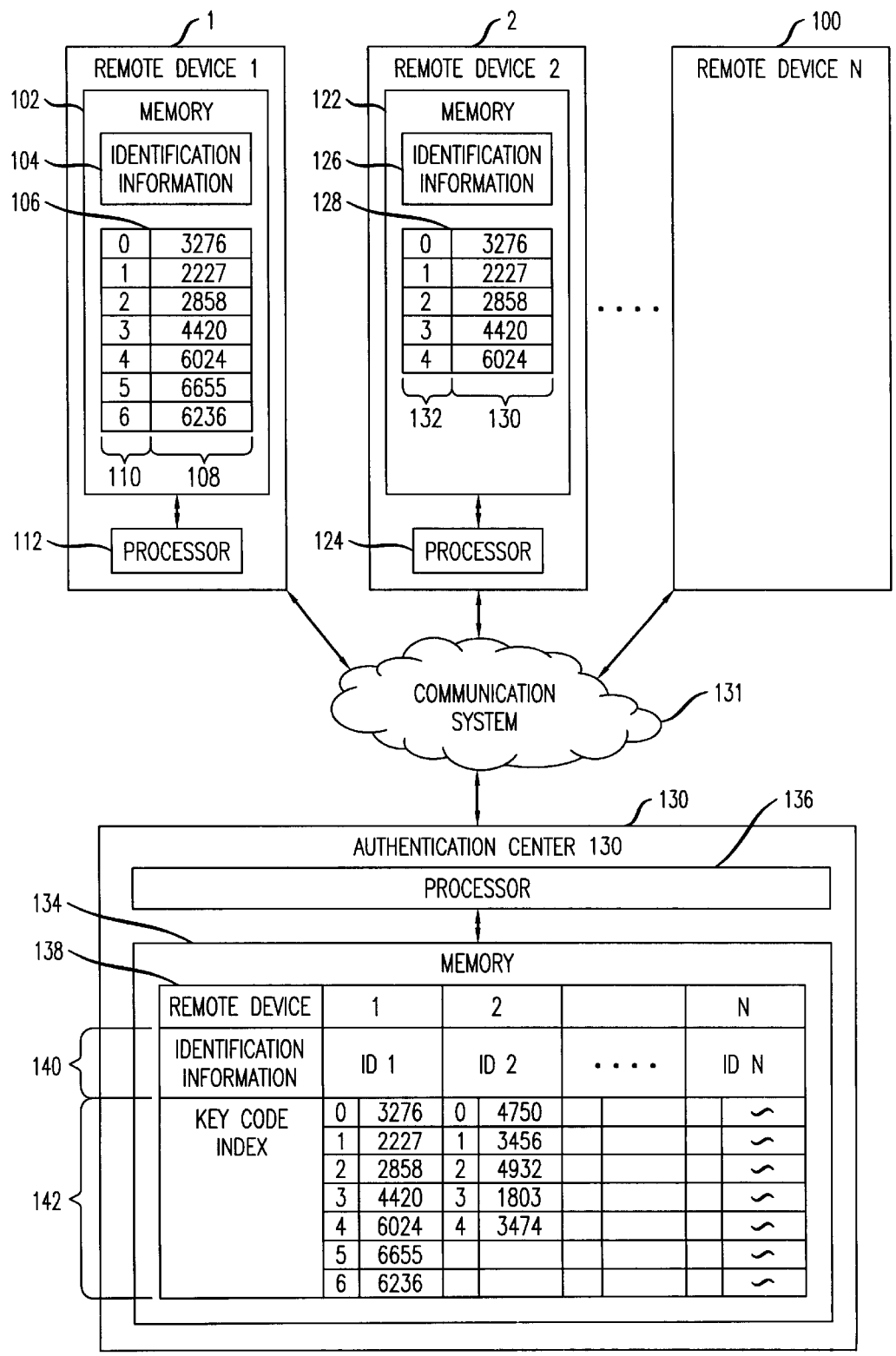
FIG. 1 illustrates an exemplary system in accordance with the principles of the present invention.

FIG. 1 is an exemplary system according to the principles of the present invention in which remote device authentication is implemented. It will be recognized that FIG. 1 is simplified for explanation purposes and that the full system environment for the invention will comprise, for example, multiple routing stations or provisions for network reliability through redundancy, all of which need not be shown here. The system illustratively includes several remote devices, (e.g. remote device 1–N) and an authentication center 130, which communicate with each other through an open communication system 131.

Remote device 1, for example a wireless telephone, includes a memory 102 and a processor 112. Memory 102 contains identification information 104, a key code index 106 that includes a plurality of key code numbers 108 and a plurality of pointers 110. Each pointer corresponds to a particular key code number. The identification information includes, for example, an equipment number, a telephone number and a PIN, hereinafter "ID1". Particularly, remote device 1 holds seven pointers (e.g., 0 to 6) and seven corresponding key code numbers (of course, fewer or more pointers and key code numbers are feasible). As will be understood by persons skilled in the art, memory 102 can be any conventional database/indexing storage means that can store and allow access to records/data.

Figure 2:
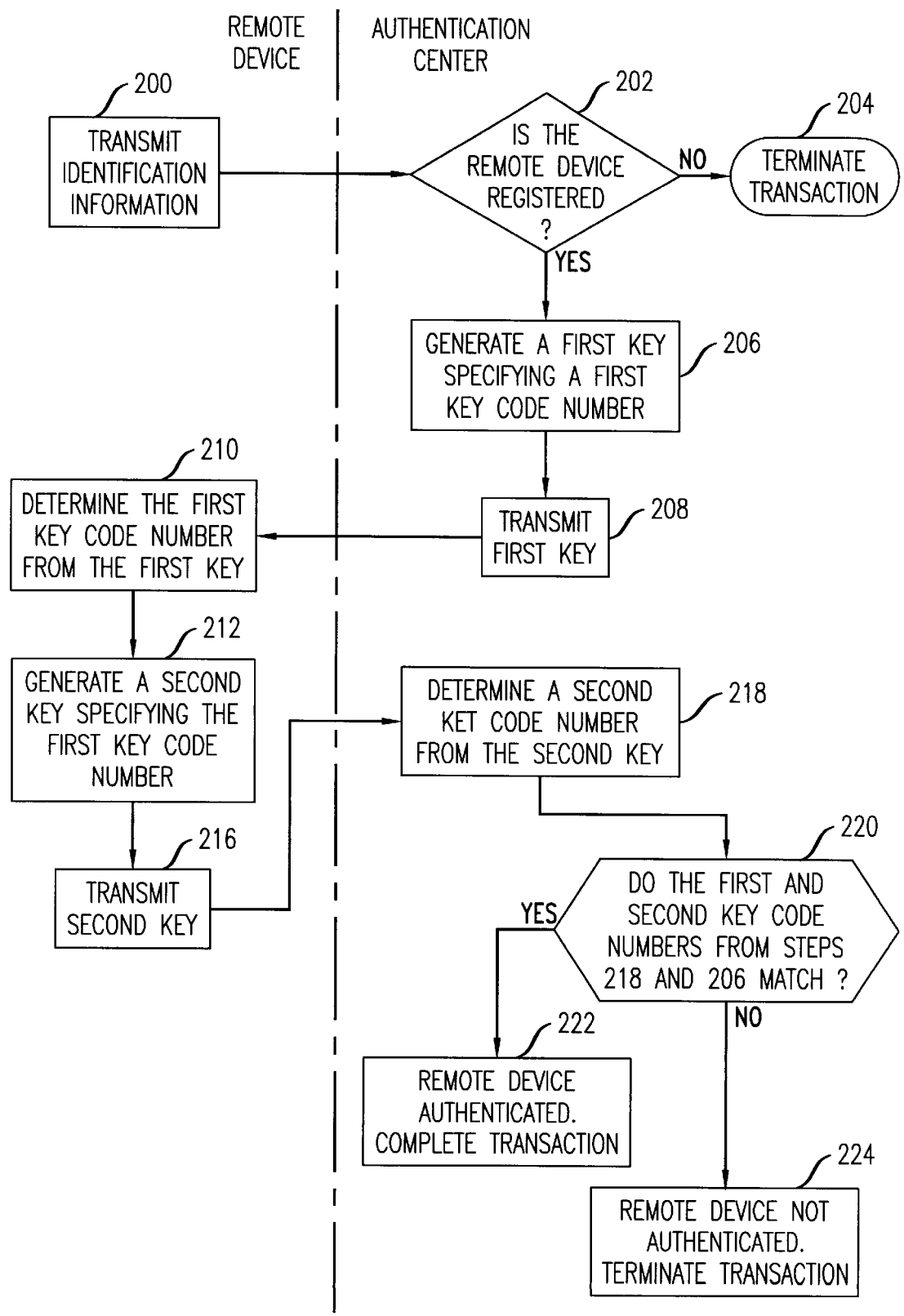
FIG. 2 is a flowchart depicting the process for authenticating a remote device of FIG. 1.

The majority of logic, control, supervisory, translation functions required for the operation of each remote device are performed by processor 112 which also includes programs for the operations functionally described in FIG. 2 and for generating random numbers. As described in detail below, execution of these programs implements the functionality necessary to authenticate a remote device. Processor 112 can be any of a number of commercially available processors.

Although remote device 1 is described as a wireless telephone, this arrangement is merely for convenience and it is to be understood that the remote devices are not limited to wireless devices, per se. As used herein, the term "remote device" refers to any type of (1) wireless, cellular or radio telephone, (2) smartcard (3) credit card, debit card, calling card used in conjunction with an Internet access device such as a personal computer, in which a remote user can communicate, access remote services or engage in commercial transactions and in which privacy and/or security is desired. The term "remote services" is any communication over or initiated over an open communication network between a remotely located user and a server. For example, the open communication network may be a cellular communications network or the Internet.

In particular, when the remote device is used to request remote services over the Internet, the remote device includes a credit card that includes a memory (e.g., an electromagnetic strip) with the identification information such as the user's name and card number and a PC or Internet access apparatus that contains a processor and another memory that contains the key code index. Alternatively, the information typically included in or on the credit card can be included in the PC or Internet access apparatus.

Although the pointers and key code numbers may generally be arbitrarily chosen, they may also be associated with each other according to predetermined relationship. For example, a pointer corresponding to a key code number may be related by a number modulo N translation, where the number is the key code number and N is equal to the total number of the key code numbers in the remote device.

Similar to remote device 1, remote device 2 includes a memory 122 and a processor 124. Again, memory 122 contains identification information 126 (hereinafter "ID2"), a key code index 128 with a plurality of key code numbers 130 and a plurality of pointers 132. In particular, remote device 2 stores five pointers (e.g., 0 to 4) and corresponding key code numbers. Further, each of the key code numbers is related to its pointer in terms of modulus N, where N=5. Preferably, each remote device has a different number of key code numbers as an added measure to help prevent unauthorized use of the remote device and reduce the probability that an interloper will circumvent the authentication system.

Authentication center 130 communicates with remote devices 1–N through an open communication system 131 (for example, as previously indicated such a communication system may be a conventional wireless system, which includes a mobile switching center, carrier network and base stations or the communication system may be the Internet). Authentication centers 130 has a memory 134 and a processor 136. Memory 134 contains a registered remote device list 138 that contains (1) identification information 140 for each remote device, (e.g., equipment numbers, telephone numbers, PINs) and (2) a master key code index 142, which includes the key code indexes of each remote device (e.g., key code index 106 and 128 of remote devices 1 and 2 respectively).

Similar to the remote devices, the majority of logic, control, supervisory, translation functions required for the operation of the authentication center are performed by processor 136 which also includes programs for the operations functionally described in FIG. 2 and for generating random numbers. As described in detail below, execution of these programs implements the functionality necessary to authenticate a remote device. Processor 136 can be any of a number of commercially available processors.

Alternatively, as will be understood by persons in the art, the registered remote device list 138 may be apportioned and distributed to a multiplicity of authentication centers to conserve memory, access and processing time. For example, with regard to a wireless communication system, each base station in the wireless network may store a portion of this information.

FIG. 2 is a flow chart showing the steps carried out within the system of FIG. 1 to implement remote device authentication according to the principles of the present invention. With simultaneous reference to FIGS. 1 and 2, the process contemplated by the invention is initiated in step 200 of FIG. 2, when a remote device transmits its identification information to an authentication center. For simplicity, a wireless telephone authentication system is used to describe the operation of the principles of the present invention, with the remote devices being wireless telephones. However, it is to be understood that the steps described in FIG. 2 are equally applicable to other remote devices described above.

In step 200, a remote device, for example remote device 1 of FIG. 1, transmits its identification information to authentication center 130 through the open communication system, namely a conventional wireless communication system. The identification information includes, for example, the equipment and telephone number of remote device 1, the user's PIN number and a called telephone number.

In step 202, the authentication center determines whether remote device 1 is registered by comparing the identification information received from remote device 1 with the identification information within the authentication center. If the identification information is not found or is inconsistent, then the authentication center invalidates the remote device and terminates the transaction, for example, disconnects the wireless call, represented by step 204. If the identification information is found, then the authentication center proceeds to step 206.

In step 206, the authentication center generates a first key specifying a first key code number in the key code index by using a first random number and a portion of the received identification information. For example, the portion of the identification information may be the PIN number. The first random number is an arbitrary random number, for example 3294. The authentication center translates the first random number into a number modulo N. Illustratively, N is equal to the number of key code numbers for remote device 1. As shown in FIG. 1, N is equal to 7. The authentication center uses this number modulo N as a pointer to the key code index for remote device 1. For example, a number modulo 7 of the first random number (3294) is 4 and the authentication center uses this number as a pointer which indicates 6024 as the first key code number based on the master key code index shown in FIG. 1. The pointer and first key code number are stored within the authentication center. The authentication center then multiplies the first random number and the PIN and transmits the result to remote device 1 through the communication system in step 208.

After receiving the first key, remote device 1, in step 210, determines the first key code number by first calculating the first random number by dividing the first key by the PIN. Remote device 1 then translates the first random number (3294), to a number modulo N, where, as above, N is equal to 7. The number modulo 7 of the first random number (3294) is 4 and remote device 1 uses this number as a pointer and recognizes 6024 as the first key code number, as shown in FIG. 1.

In step 212, the remote device generates a second key First, a second random number is generated such that the number modulus N of the first and second random numbers are equal. The second random number is, for example, 2356. In particular, the first random number (3294) modulus 7 and the second random (2356) number modulus 7 both equal to 4. One method for generating the second random number includes generating random numbers, translating the random numbers into numbers modulo 7 and selecting a random number from the generated random numbers, such that number modulus 7 is 4. Thereafter, the remote device multiplies the PIN, the first key code number (6024) and the second random number (2356), which results in the second key that is transmitted to the authentication center over the communication system in step 216.

In step 218, the authentication center determines a second key code number using the second key. Specifically, the second key is divided by the PIN and the first key code number (6024), resulting in a second random number. Then, the authentication center translates the second random number to a pointer using number modulo N, where N=7. The authentication center uses this number modulo N as a pointer to the key code index of remote device 1 to determine the second key code number. This second key code is compared to the first key code number generated by the authentication center in step 206. (Alternatively, the number modulus N of the first random number is compared with the number modulus N of the second random number.) If the first and second key code the numbers match (or if the random numbers modulus N match) the authentication center authenticates remote device 1. Accordingly, remote device 1 is allowed to complete a transaction, represented by step 222. However, as represented by step 224, if the first and second key code numbers do not match (or if the random numbers modulus N do not match), remote device 1 is not authenticated and the transaction is not allowed to complete.

As will be understood by persons skilled in the art, variations of the method are possible. For example, instead of a method using a combination of multiplication and division to generate and determine the first and second keys, as described above, the method may be carried out by a combination of addition and subtraction.

Advantageously, even if an interloper intercepts a transmission between the authentication center and the remote device, he or she can not directly detect the key code number, since the key code numbers are encrypted in the first and second keys. However, even if a key code number is detected, the probability that the particular key code number will be used for the next transaction is small (e.g., 1/N). Thus, an interloper can not impersonate a registered remote device unless he or she has the key code index specified in the authentication center.

Finally, it is to be understood that although the invention is disclosed herein in the context of particular illustrative embodiments, those skilled in the art will be able to devise numerous alternative arrangements. Such alternative arrangements, although not explicitly shown or described herein, embody the principles of the present invention and are thus within its spirit and scope.

What is claimed is:

1. A method of authenticating a remote device, the method comprising the steps of:
    (a) transmitting identification Information from the remote device to an authentication center of a service provider, wherein the remote device and the authentication center of said service provider each contain an identical key code index, the key code index including a plurality of key code numbers;
    (b) generating a first key at the authentication center using at least a portion of the identification information and a first random number, wherein the first random number specifies a first key code number that is one of the plurality of key code numbers;
    (c) transmitting the first key from the authentication center to the remote device;
    (d) determining the first key code number at the remote device using the first key;

(e) generating a second key at the remote device using the first key code number and a second random number, wherein the second random number specifies a second key code number;

(f) transmitting the second key to the authentication center;

(g) determining the second key code number at the authentication center using the second key;

(h) comparing, at the authentication center, the first key code number and the second key code number; and (i) authenticating the remote device when the first and second key code numbers in the comparing step match.

2. The method of claim 1, wherein said transmitting the identification information includes transmitting a telephone number and PIN number associated with a wireless telephone, said wireless telephone being said remote device.

3. The method of claim 1, wherein said transmitting the identification information includes transmitting a card number and a user name associated with a smart card, said smart card being said remote device associated with an internet access device.

4. The method of claim 1, wherein said transmitting the identification information comprises transmitting credit card information associated with a credit card, said credit card being said remote device associated with an internet access device.

5. The method of claim 1 further including the step of determining whether the remote device is a registered remote device, before the authentication center transmits the first key, by using the identification information; and transmitting the first key from the authentication center only when the remote device is a registered remote device.

6. The method of claim 5, wherein said generating the first key at the authentication center further comprises:

translating the first random number into a number modulo N, where N is equal to the number of key code numbers in the plurality of key code numbers;

using the number modulo N as one of a plurality of pointer values to specify the first key code number in the key code index;

multiplying the first random number and said portion of the identification information to yield a product value; and transmitting said product value to the remote device.

7. The method of claim 6, wherein the step of generating the second key includes generating the second random number such that the number modulus N of the first random number and the second random number are equal.

8. The method of claim 7, further comprising:

defining each pointer value equal to its corresponding key code number translated to a number modulus N.

9. The method of claim 1, wherein the comparing step includes comparing the number modulus N of the first random number with the number modulus N of the second random number.

10. An authentication system comprising:

at least one remote device, each remote device comprising:

a memory containing identification information and a key code index, the key code index having a plurality of key code numbers; and means for transmitting a portion of the identification information;

an authentication center facilitated at a service provider, comprising:

a memory containing the identification information and the key code index for each remote device;

means for generating a first key using a portion of a particular identification information received from a particular remote device and a first random number, wherein the first random number specifies a first key code number that is one of the plurality of key code numbers, and means for transmitting the first key to the particular remote device;

means for determining the first key code number at the particular remote device using the first key and the particular identification information;

means for generating a second key at the remote device using the first key code number and a second random number, wherein the second random number specifies a second key code number;

means for transmitting the second key to the authentication center of said service provider; and means for comparing, at the authentication center, the first key code number determined from the first key and the second key code number determined from the second key, wherein the remote device is authenticated when the first and second key code numbers match.

11. A remote device for use with an authentication center of a service provider, the remote device comprising:

means for communicating with the authentication center of said service provider, wherein the authentication center includes a key code index having a plurality of key code numbers;

a memory containing the key code index and identification information; and a processor for determining a first key code number from a first key received from the authentication center, wherein the first key includes a first random number and at least a portion of the identification information, and for generating a second key that includes a second random number specifying a second key code number, wherein the first random number is equal to the second random number in terms of modulus N, where N is equal to the number of key code numbers in the plurality of key code numbers.

12. The remote device of claim 11, wherein the remote device is a wireless telephone and the identification information includes a telephone number and PIN number.

13. The remote device of claim 11, wherein the remote device is a smartcard and the identification information includes a card number and a user name.

14. The remote device of claim 11, wherein the remote device is a credit card used in conjunction with an Internet access device, wherein a portion of the identification information is stored in the credit card and a portion of the identification information is stored the Internet access device.

* * * * *